US012607299B1

(12) United States Patent

Kubala et al.

(10) Patent No.: US 12,607,299 B1

(45) Date of Patent: Apr. 21, 2026

(54) REMOVABLE BRACKET ASSEMBLY FOR SUPPORT STRUCTURE ACCESSORY ATTACHMENT

(71) Applicants: Eric Kubala, Owasso, OK (US); Michelle Kubala, Owasso, OK (US)

(72) Inventors: Eric Kubala, Owasso, OK (US); Michelle Kubala, Owasso, OK (US)

( * ) Notice: Subject to any disclaimer, the term of this patent is extended or adjusted under 35 U.S.C. 154(b) by 0 days.

(21) Appl. No.: 19/183,429

(22) Filed: Apr. 18, 2025

(51) Int. Cl.
*F16M 11/00* (2006.01)
*F16M 13/02* (2006.01)

(52) U.S. Cl.
CPC ................................. *F16M 13/022* (2013.01)

(58) Field of Classification Search
CPC ................................................... F16M 13/022
See application file for complete search history.

(56) References Cited

U.S. PATENT DOCUMENTS

| | | | | |
|---|---|---|---|---|
| 4,566,819 | A * | 1/1986 | Johnston | ................... E04G 7/16 403/385 |
| 5,542,776 | A * | 8/1996 | Reynolds | .............. F16L 3/1075 24/115 L |
| 6,786,302 | B2 * | 9/2004 | Liew | ......................... E04G 7/14 248/316.5 |
| 8,038,106 | B2 | 10/2011 | Magno, Jr. et al. | |
| 8,789,605 | B2 * | 7/2014 | Sessions | ............... E21B 17/105 166/360 |
| 9,927,063 | B2 | 3/2018 | Keller | |
| 11,703,171 | B2 * | 7/2023 | Hinton | .................... F16L 23/06 285/312 |
| 2007/0108364 | A1 | 5/2007 | Metheny | |
| 2017/0089515 | A1 | 3/2017 | Snyder et al. | |

* cited by examiner

*Primary Examiner* — Amy J. Sterling

(74) *Attorney, Agent, or Firm* — Vincent J. Allen; Stephanie E. Scoggin; Carstens, Allen & Gourley, LLP

(57) ABSTRACT

A bracket assembly for attaching accessories to a support structure. The bracket assembly can include a body defining an open channel with a first edge and a second edge, a latch, and an attachment interface. The channel is configured to engage a support structure. The latch removably couples the first edge of the body to the second edge of the body and is configured to tightly and removably secure the bracket assembly to the dimensions of the support structure. The attachment interface removably couples the bracket assembly to an accessory.

26 Claims, 12 Drawing Sheets

REMOVABLE BRACKET ASSEMBLY FOR SUPPORT STRUCTURE ACCESSORY ATTACHMENT

TECHNICAL FIELD

The present disclosure relates in general to the field of attachment assemblies, and more particularly to a novel bracket assembly for securely and removably attaching accessories to support structures such as posts and railings, as well as systems and methods of use.

BACKGROUND

Boat docks and residential decks are typically constructed using solid supports such as posts and railings. It is often desirable to attach accessories to these solid supports to improve the functionality of the structure. For example, a user may want to attach additional structures to support posts and railings to improve access to hard-to-reach areas of the dock or deck. In another example, a user may want to secure outdoor furniture to the support structures.

A user may attach an accessory to a support by altering the support. For example, a user may drill a hole in the support to attach an accessory, but this can be difficult to achieve without the right tools or skills. Additionally, drilling into the support can compromise its structural integrity, potentially weakening the support and raising concerns about the long-term stability of the dock or deck. Alternatively, in the case of a metal support, a user could weld an accessory to the support. Again, this method requires specialized tools and skill. Moreover, permits are often required to make such permanent alterations to boat docks and residential decks.

What is needed in the art is a bracket assembly for securely and removably attaching accessories to support posts and railings without altering the support, and related methods of manufacturing, installation, and use, that do not suffer from deficiencies found in conventional methods of accessory attachment.

SUMMARY

Novel aspects of the present disclosure are directed to a bracket assembly comprising a body defining an open channel with a first edge and a second edge, wherein the channel is configured to engage a support structure. The bracket assembly can include a latch configured to removably couple the first edge of the body to the second edge of the body, wherein a change in orientation or position of the latch selectively reduces an effective interior cross-sectional area of the body to control a clamping force on the support structure. The bracket assembly can also include one or more attachment interfaces for removably coupling the bracket assembly to an accessory.

In another embodiment, novel aspects of the disclosed principles are directed to a method of removably and securely coupling an accessory to a support structure comprising securely coupling a bracket assembly to a support structure, wherein the bracket assembly comprises a body defining a generally c-shaped open channel with a first edge and a second edge, wherein the channel is configured to engage a support structure; a latch configured to removably couple the first edge of the body to the second edge of the body, wherein a change in orientation or position of the latch selectively reduces an effective interior cross-sectional area of the body to control a clamping force on the support structure; and one or more attachment interfaces configured to removably couple the bracket assembly to an accessory. The method can also include coupling an accessory to the bracket assembly.

This summary is provided to introduce a selection of concepts in a simplified form that are further described in the detailed description. It is not intended to identify key or essential features of the claimed invention, nor is it intended to be used to limit the scope of the claims.

Other aspects, embodiments, and features of the disclosed principles will become apparent from the following detailed description when considered together with the accompanying figures. In the figures, each identical or substantially similar component that is illustrated in various figures is represented by a single numeral or notation. For the purposes of clarity, not every component is labeled in every figure. Nor is every component of each embodiment of the disclosed principles shown where illustration is not necessary to allow those of ordinary skill in the art to understand the principles disclosed herein.

BRIEF DESCRIPTION OF THE DRAWINGS

The novel features believed characteristic of the disclosure are set forth in the appended claims. The disclosure itself, however, as well as a preferred mode of use, further objectives, and advantages thereof, will be best understood by reference to the following detailed description of illustrative embodiments when read in conjunction with the accompanying drawings, in which:

Figure 1A:
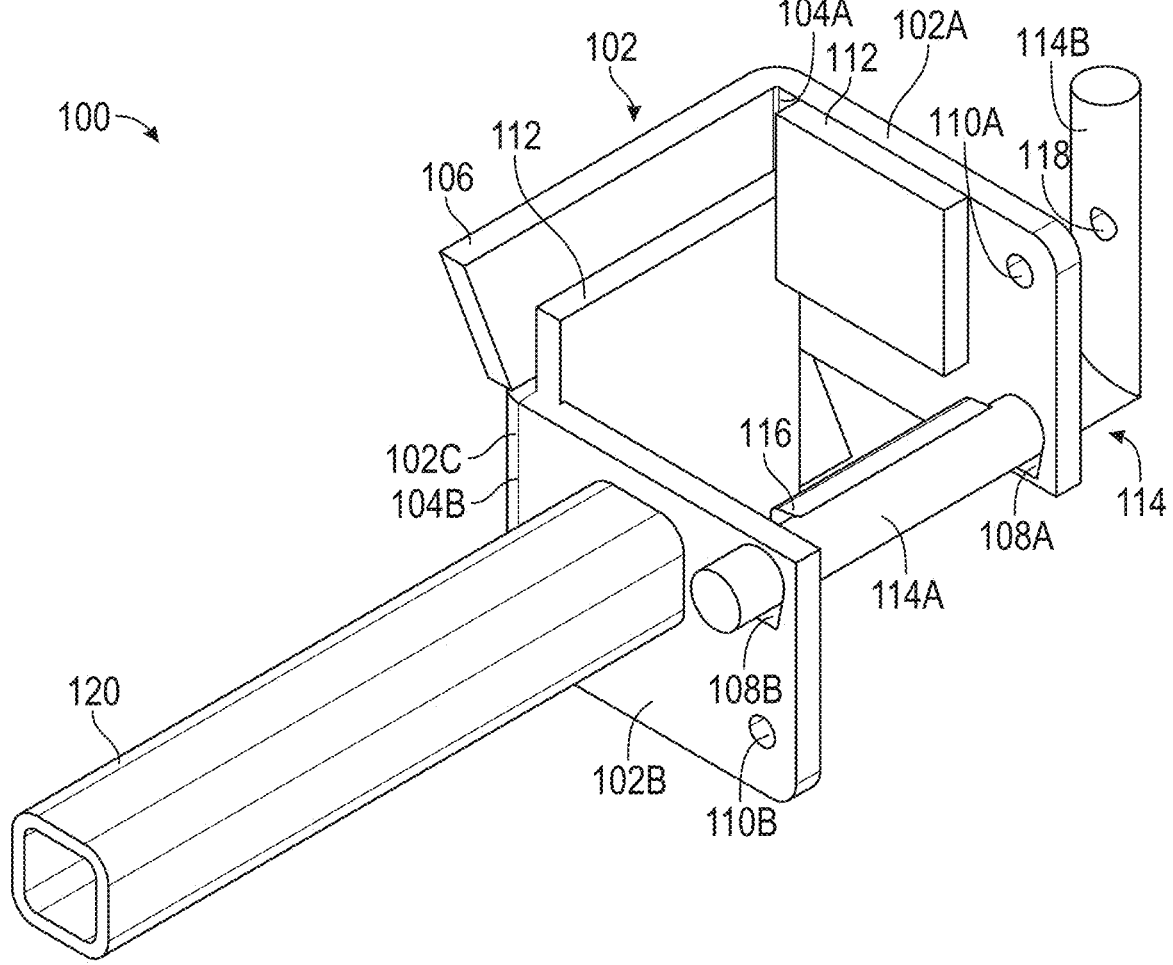
FIG. 1A illustrates an isometric view of an embodiment of an exemplary bracket assembly designed and constructed in accordance with the disclosed principles.

INDEX OF REFERENCE NUMERALS
AND DEFINITIONS

| Reference | Element |
| --- | --- |
| 100 | bracket assembly |
| 102 | body |
| 102A | first wall |
| 102B | second wall |
| 102C | side wall |
| 104A | joining edge |
| 104B | joining edge |
| 106 | flange |
| 108 | first set of apertures |
| 108A | first aperture |
| 108B | second aperture |
| 110 | second set of apertures |
| 110A | third aperture |
| 110B | fourth aperture |
| 112 | gasket |
| 114 | latch |
| 114A | pin |
| 114B | handle |
| 116 | handle aperture |
| 118 | protrusion |
| 120 | support shaft |
| 802 | support structure |
| 804 | arrow |
| 902 | platform |
| 1002 | table |
| 1102 | eye hook |

DETAILED DESCRIPTION

Novel aspects of this disclosure recognize the need for a device for attaching accessories to boat docks, residential decks, and other structures without altering the structures. To this end, an improved bracket assembly is provided that can be securely and removably coupled to a support of a boat dock or deck or other structure and an accessory.

FIGS. 1-7 illustrate various perspectives of one embodiment of a bracket assembly 100 designed and constructed in accordance with the disclosed principles. Referring to FIG. 1A, illustrated is an isometric view of one embodiment of a bracket assembly 100. The bracket assembly 100 may include a body 102 that defines a generally c-shaped open channel for engaging a support structure. The body 102 may have an inner surface and outer surface, wherein the inner surface may contact a support structure. The body 102 may comprise a first wall 102A and a second wall 102B spaced therefrom. A side wall 102C may join the first wall 102A to the second wall 102B. In the non-limiting exemplary embodiment illustrated in FIG. 1A, the body 102 may be shaped such that the body 102 may engage a support structure with a rectangular cross section. In another embodiment, the body 102 may be a semi-circular annular cylinder such that the body 102 may engage a cylindrical support structure. It will be understood by those of ordinary skill in the art that the shape of the body 102 is not limited to the above-mentioned configurations and may be shaped to engage a variety of differently shaped support structures. The body 102 may also be sized to engage support structures of various sizes.

In the non-limiting exemplary embodiment illustrated in FIG. 1A, each of the walls 102A, 102B, 102C may be planar. The first wall 102A may be substantially parallel to the second wall 102B. The side wall 102C may be positioned substantially perpendicular to the first wall 102A and second wall 102B and may contact a joining edge 104A of the first wall 102A and a joining edge 104B of the second wall 102B to join the first wall 102A to the second wall 102B. The walls 102A, 102B, 102C may each be substantially rectangular in shape. However, other shapes that can achieve the same utility are within the scope of the claims. The body 102 may also be shaped to facilitate sliding of the bracket assembly 100 along a support structure. In the non-limiting exemplary embodiment illustrated in FIG. 1A, the side wall 102C may include planar flanges 106 extending from the top and bottom edges of the side wall 102C. The flanges 106 may have a greater width than the side wall 102C such that the flanges 106 extend beyond the first wall 102A and second wall 102B. The flanges 106 may also include one or more angled edges. However, it is understood that flanges 106 with other dimensions are within the scope of the present disclosure. The flanges 106 may also be angled away from the body 102. In the non-limiting exemplary embodiment illustrated in FIG. 1A, the flanges 106 are angled away from the body 102 in the z-direction. A shape of the side wall 102C with flanges 106 may be better appreciated with reference to FIG. 4 and FIG. 5. In an embodiment, one or more of the first wall 102A and second wall 102B may additionally or alternatively include one or more flanges 106 extending from their respective top and bottom edges. In an embodiment, the walls 102A, 102B, 102C and/or the flanges 106 may be integrally formed such that the body 102 may be formed as a unitary component. Alternatively, the body 102 may be formed by joining the distinct walls 102A, 102B, 102C and flanges 106 in accordance with the principles described herein.

The body 102 may also include a plurality of apertures disposed through the first wall 102A and second wall 102B. The apertures may be positioned distal to the joining edges 104A, 104B of the first wall 102A and second wall 102B. A first set of apertures may include a first aperture 108A and a second aperture 108B sized and shaped to receive a pin 114A, discussed in greater detail below. In the non-limiting exemplary embodiment illustrated in FIG. 1A, a first aperture 108A may be formed through the first wall 102A. A second aperture 108B may be formed through the second wall 102B and may be aligned with the first aperture 108A. In exemplary embodiments, when referring to a bracket assembly 100 as disclosed herein, the first aperture 108A and second aperture 108B may be referred to collectively as the first set of apertures 108. The first set of apertures 108 may also be sized and shaped to receive a protrusion 116 disposed on the pin 114A, discussed in greater detail below. A second set of apertures may include a third aperture 110A and a fourth aperture 110B sized and shaped to receive a second pin (not shown) to maintain the assembly in the assembled, secure configuration, discussed in greater detail below. In the non-limiting exemplary embodiment illustrated in FIG. 1A, a third aperture 110A may be formed through the first wall 102A. A fourth aperture 110B may be formed through the second wall 102B. In exemplary embodiments, when referring to a bracket assembly 100 as disclosed herein, the third aperture 110A and fourth aperture 110B may be referred to collectively as the second set of apertures 110.

The bracket assembly 100 may also include a latch 114 for removably coupling the first wall 102A of the body 102 to the second wall 102B of the body 102. In the non-limiting exemplary embodiment illustrated in FIG. 1A, the latch 114 may include a cylindrical pin 114A sized and shaped to rotatably engage the first aperture 108A disposed through the first wall 102A and second aperture 108B disposed through the second wall 102B. The pin 114A may be inserted therein to couple the first wall 102A to the second wall 102B and place the bracket assembly 100 into an assembled configuration, discussed in greater detail below. In an embodiment, the pin 114A may be a standard hinge pin or the like. In another embodiment, the pin 114A may be configured to maintain the latch 114 disposed through the first set of apertures 108 such that the bracket assembly 100 remains in the assembled position. For example, the pin 114A may be a detent pin or a clevis pin. In another embodiment, the pin 114A may include a threaded portion for attachment of a nut to maintain the latch 114 disposed through the first set of apertures 108.

The latch 114 may also include a handle 114B for rotating the latch 114 about the longitudinal axis of the pin 114A. The handle 114B may be a lever or knob extending from the pin 114A. In the non-limiting exemplary embodiment illustrated in FIG. 1A, the latch 114 may be L-shaped, wherein the handle 114B extends peripherally and perpendicularly outward from one end of the pin 114A. In another embodiment, the latch 114 may be U-shaped, wherein the latch 114 bends back on itself such that the pin 114A and the handle 114B are disposed in parallel relation to one another and spaced a fixed distance from one another. One of ordinary skill in the art will understand that the latch 114 is not limited to the disclosed shapes and may be any shape that can provide the same utility. Like the pin 114A, the handle 114B may be cylindrical. However, one of ordinary skill in the art will recognize that the handle 114B is not limited to a cylindrical shape and may be any shape with the same utility.

The body 102 and the latch 114 may be formed from one or more of any suitable rigid materials, including but not limited to plastic, metal, ceramic materials, composite materials, and the like. Other materials that provide the same utility are within the scope of the claims. Moreover, the components of the body 102 and the latch 114 may be made by any suitable process, including but not limited to casting, molding, forming, forging, machining, and the like.

The dimensions of support structures often vary. Additionally, structures like boat docks and residential decks are exposed to environmental conditions such as rain and snow. Furthermore, a user may want to couple a heavy accessory to the support structure. It may therefore be desirable to tighten the bracket assembly 100 to the exact dimensions of the support structure to ensure a secure fit. To this end, the latch 114 may also include a tightening means for tightly securing the bracket assembly 100 to a support member. In the non-limiting exemplary embodiment illustrated in FIG. 1A, the tightening means may include a protrusion 116 at least partially surrounding the circumference of the pin 114A and configured to provide force and friction against the support structure. The protrusion 116 may be sized and positioned to engage the first set of apertures 108A, 108B during assembly such that the latch 114 may be inserted through the first set of apertures 108A, 108B. The protrusion 116 may also be sized and positioned not to engage the first set of apertures 108A, 108B after assembly is complete. That is, the protrusion 116 may be configured to avoid obstructing rotation of the pin 114A within the first set of apertures 108A, 108B. The orientation of the protrusion 116 may be altered by pivoting the handle 114B of latch 114.

The tightening means may also include a plurality of gaskets 112 fixed to the inner surface of the body 102 to provide sealing friction against the support structure. The gaskets 112 may be disposed one on or more of the first wall 102A, second wall 102B, and side wall 102C. The gaskets 112 may be sized and shaped to correspond to the size and shape of the walls 102A, 102B, 102C. In the non-limiting exemplary embodiment illustrated in FIG. 1A, the bracket assembly 100 may include rectangular gaskets 112 fixed to the inner surface of the first wall 102A, second wall 102B (not shown), and side wall 102C. The gaskets 112 may also be sized and positioned to avoid obstructing the plurality of apertures 108, 110 disposed through the body 102. The plurality of gaskets 112 may be positioned adjacent to one another, either spaced apart or in contact with one another. In an embodiment, the plurality of gaskets 112 can include separate gaskets 112 attached or fitted together. In another embodiment, the plurality of gaskets 112 may be molded into a single unitary component. In an embodiment, the surface of the gaskets 112 may be smooth. In another embodiment, the gaskets 112 may be ribbed to increase friction and facilitate sealing. The gaskets 112 may be formed of typical materials used for gaskets, such as polyurethane foam, urethane, rubber, silicone, and any other typical gasket material. The tightening means depicted in the non-limiting exemplary embodiment illustrated in FIG. 1A is discussed in greater detail with reference to FIG. 8. In an alternative embodiment, the tightening means may be in the form of other manually activatable and deactivatable tightening devices known in the prior art.

To prevent the tightening means from being inadvertently deactivated, it may be desirable to lock the bracket assembly 100 in the assembled, secured configuration, discussed in greater detail below. To this end, the latch 114 may also include a handle aperture 118 disposed transversely through the body of the handle 114B to allow a pin to be used to lock the handle 114B in a desired orientation. The handle aperture 118 may be sized and positioned to align with one of the second set of apertures 110A, 110B disposed through the body 102 when the handle 114B is in a desired orientation. In the non-limiting exemplary embodiment illustrated in FIG. 1A, the handle aperture 118 may align with the third aperture 110A when the handle 114B is pivoted to the upright position. A second pin (not shown) may be inserted through both the handle aperture 118 and the third aperture 110A to maintain the handle 114B in the upright position, thereby preventing the tightening means from being inadvertently deactivated and maintaining the bracket assembly 100 in the assembled, secured position. The second pin (not shown) may be a standard dowel pin, a locking pin, or the like.

To assemble the bracket assembly 100, discussed in more detail below, the latch 114 may be inserted through either of the first set of apertures 108A, 108B. The latch 114 may be inserted through the first set of apertures 108A, 108B from either side of the body 102 such that the handle 114B of the latch 114 may be positioned on either side of the bracket assembly 100. In the non-limiting exemplary embodiment illustrated in FIG. 1A, the pin 114A of the latch 114 may first be inserted through the first aperture 108A and then through the second aperture 108B such that the handle 114B is positioned proximate to the first wall 102A. Alternatively, the pin 114A may be inserted first through the second aperture 108B and then through the first aperture 108A such that the handle 114B is positioned proximate to the second wall 102B. This alternative configuration may be appreciated with reference to FIG. 1B, discussed below.

The bracket assembly 100 may also include one or more attachment interfaces for coupling accessories to the bracket assembly 100 and thereby coupling accessories to a support structure. In the non-limiting exemplary embodiment illustrated in FIG. 1A, the attachment interface may be a support shaft 120. In an embodiment, the support shafts 120 may be permanently affixed to the body 102. That is, the support shafts 120 and the body 102 may be integrally formed as a unitary component. In another embodiment, the support shafts 120 may be removably coupled to the body 102 by any appropriate means. As a non-limiting example, the support shaft 120 may include a threaded rod (not shown) sized and positioned to engage a threaded aperture (not shown) disposed through the body 102. The support shaft 120 may be constructed from any appropriate rigid material, including but not limited to plastic, metal, ceramic materials, composite materials, and the like. Other materials that provide the same utility are within the scope of the claims. In the non-limiting exemplary embodiment illustrated in FIG. 1A, the support shaft 120 may be constructed from rigid rectangular tubing such that the bracket assembly 100 may be coupled to an accessory by inserting the support shaft 120 into larger rectangular tubing or a rectangular aperture of the accessory. The support shaft 120 may also be coupled to an accessory by receiving rectangular tubing of the accessory. In another embodiment, the support shaft 120 may be tubing of another shape, including but not limited to cylindrical tubing. Alternatively, the support shaft 120 may be a solid bar or rod. In the non-limiting exemplary embodiment illustrated in FIG. 1A, a support shaft 120 may perpendicularly extend from the second wall 102B. However, one of ordinary skill in the art will appreciate that the support shaft 120 may extend from the body 102 at a variety of angles. In an alternative embodiment, support shafts 120 may extend from one or more of the first wall 102A, second wall 102B, and side wall 102C.

Figure 1B:
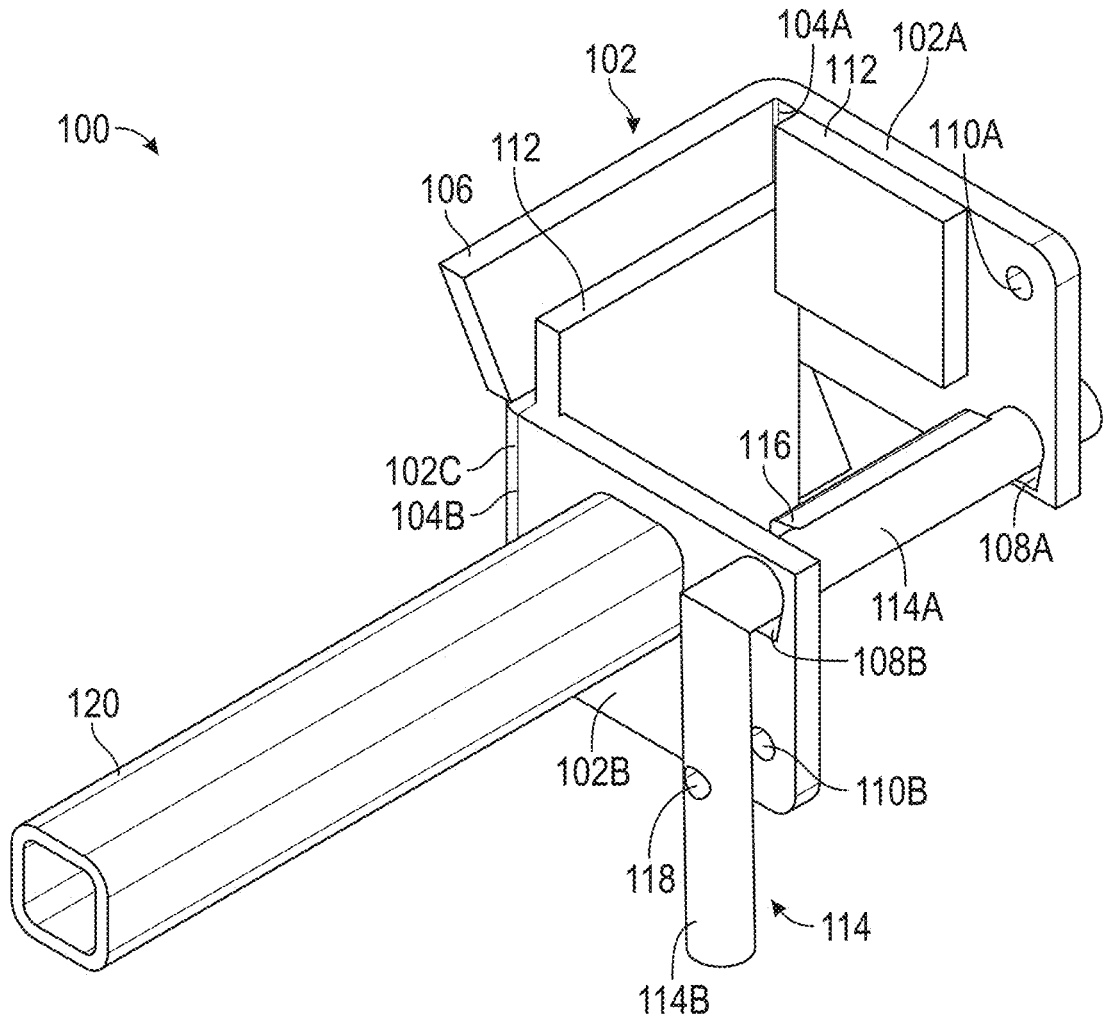
FIG. 1B illustrates an isometric view of an embodiment of an exemplary bracket assembly designed and constructed in accordance with the disclosed principles.

Referring to FIG. 1B, illustrated is an isometric view of an exemplary embodiment of a bracket assembly 100 designed and constructed in accordance with the disclosed principles. As depicted in the non-limiting exemplary embodiment illustrated in FIG. 1B, the pin 114A of the latch 114 may be inserted such that the handle 114B of the latch 114 is positioned proximate to the second wall 102B. That is, the pin 114A of the latch 114 may first be inserted through the second aperture 108B and may then be inserted through the first aperture 108A. In the non-limiting exemplary embodiment illustrated in FIG. 1B, the handle aperture 118 may align with the fourth aperture 110B when the handle 114B is pivoted to the downward position. A second pin (not shown) may be inserted through the handle aperture 118 and the fourth aperture 110B to maintain the handle 114B in the downward position, thereby preventing the tightening means from being inadvertently deactivated and maintaining the bracket assembly 100 in the assembled, secured position.

Figure 2:
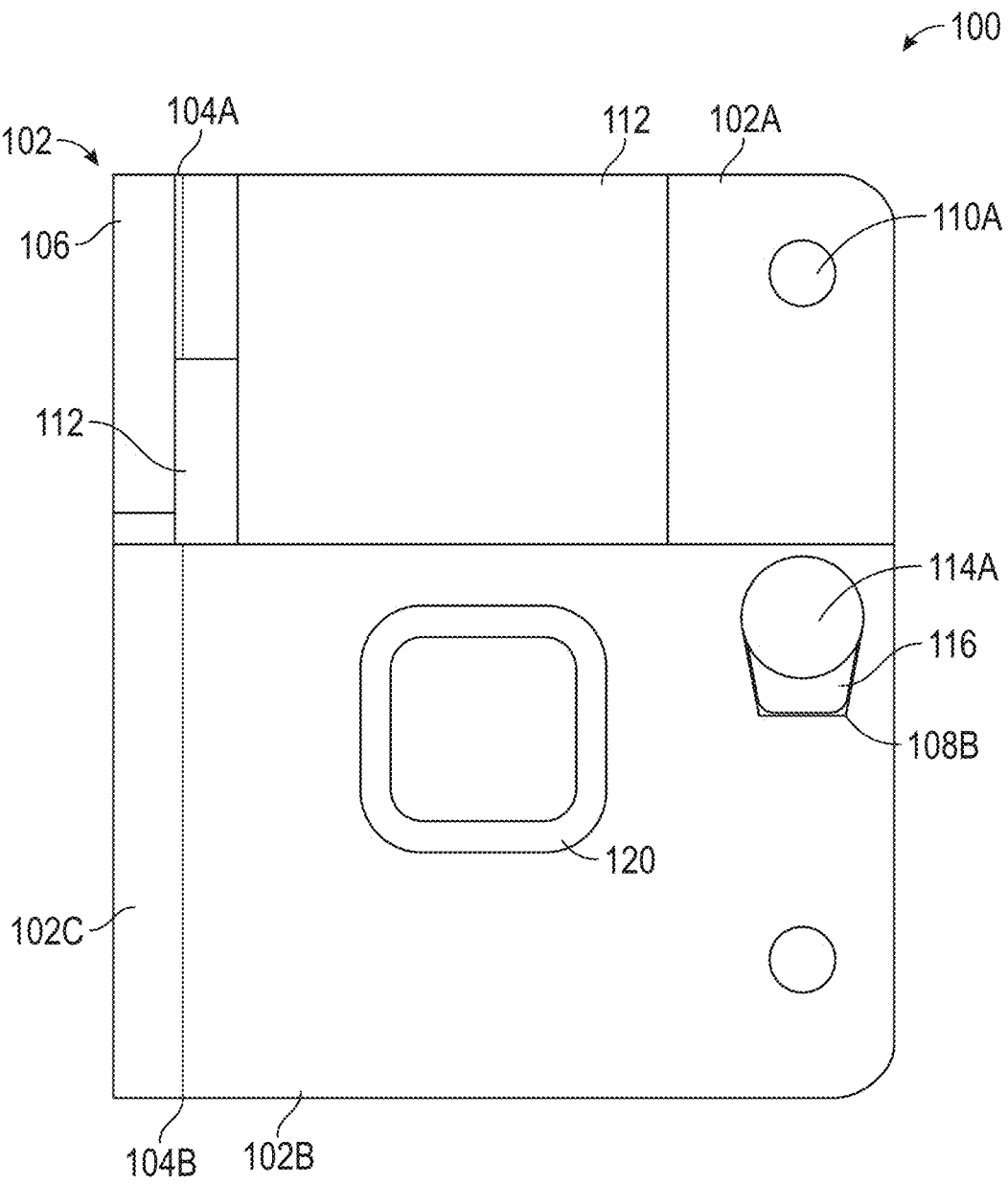
FIG. 2 illustrates an isometric side view of an exemplary embodiment of a bracket assembly.
Figure 3:
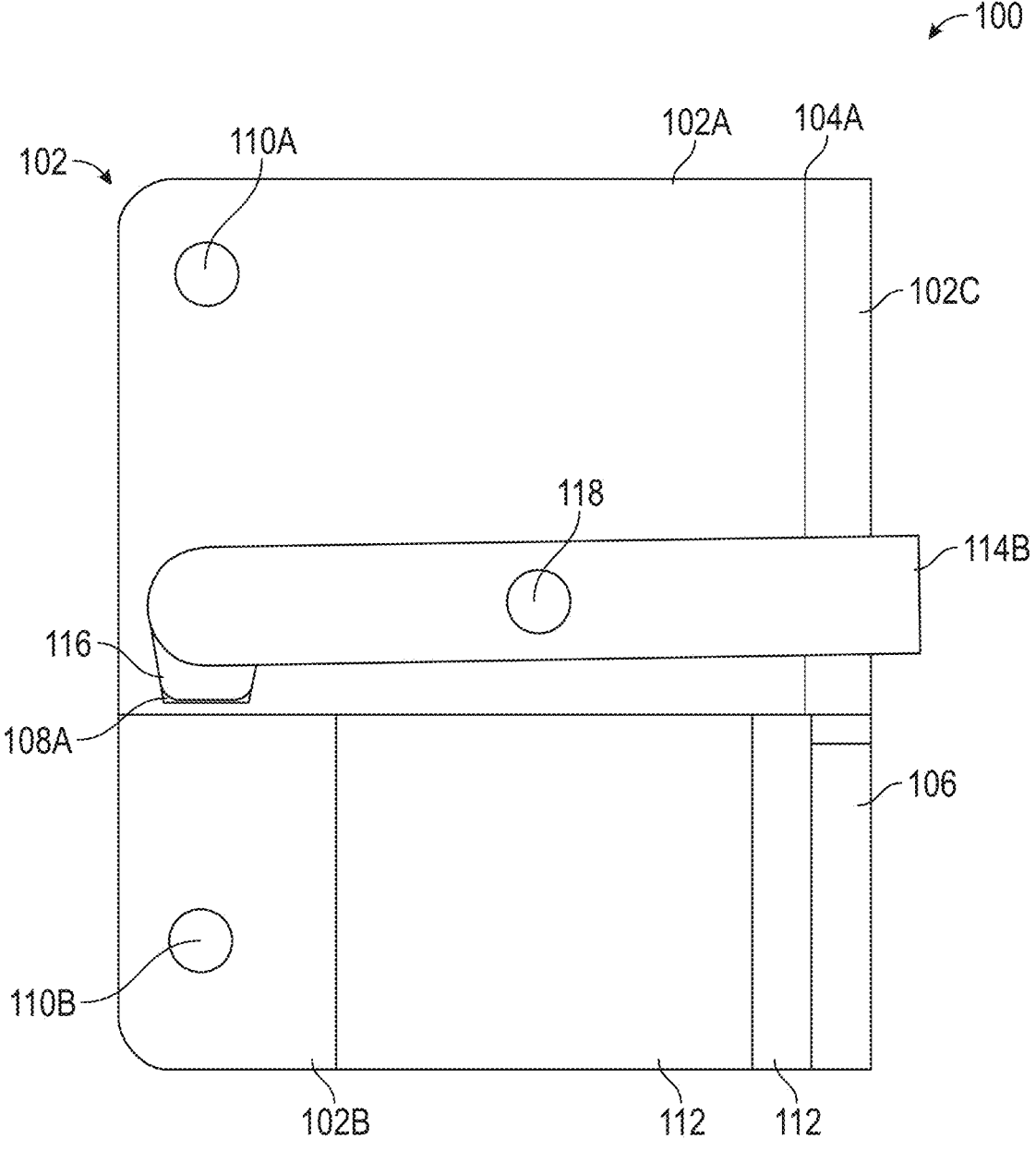
FIG. 3 illustrates an isometric side view of an exemplary embodiment of a bracket assembly.

Referring to FIG. 2 and FIG. 3, illustrated are isometric side views of an exemplary embodiment of a bracket assembly 100 designed and constructed in accordance with the disclosed principles. As previously discussed, the bracket assembly 100 may include a plurality of gaskets 112 fixed to the inner surface of the body 102. In the non-limiting exemplary embodiments illustrated in FIG. 2 and FIG. 3, the gaskets 112 may be sized and positioned to avoid obstructing the apertures 108, 110 disposed through the body 102. As previously discussed, the bracket assembly 100 may also include a protrusion 116 that at least partially surrounds the circumference of the pin 114A. The protrusion 116 may be sized and positioned to engage the first set of apertures 108A, 108B during assembly such that the pin 114A of the latch 114 may be received by the first set of apertures 108A, 108B. In the non-limiting exemplary embodiment illustrated in FIG. 2 and FIG. 3, the protrusion 116 may be oriented toward the bottom of the bracket assembly 100 such that the protrusion 116 is aligned with the first set of apertures 108A, 108B and oriented away from the channel. The position of the protrusion 116 may be altered by pivoting the handle 114B, which is discussed in greater detail with reference to FIG. 8.

Figure 4:
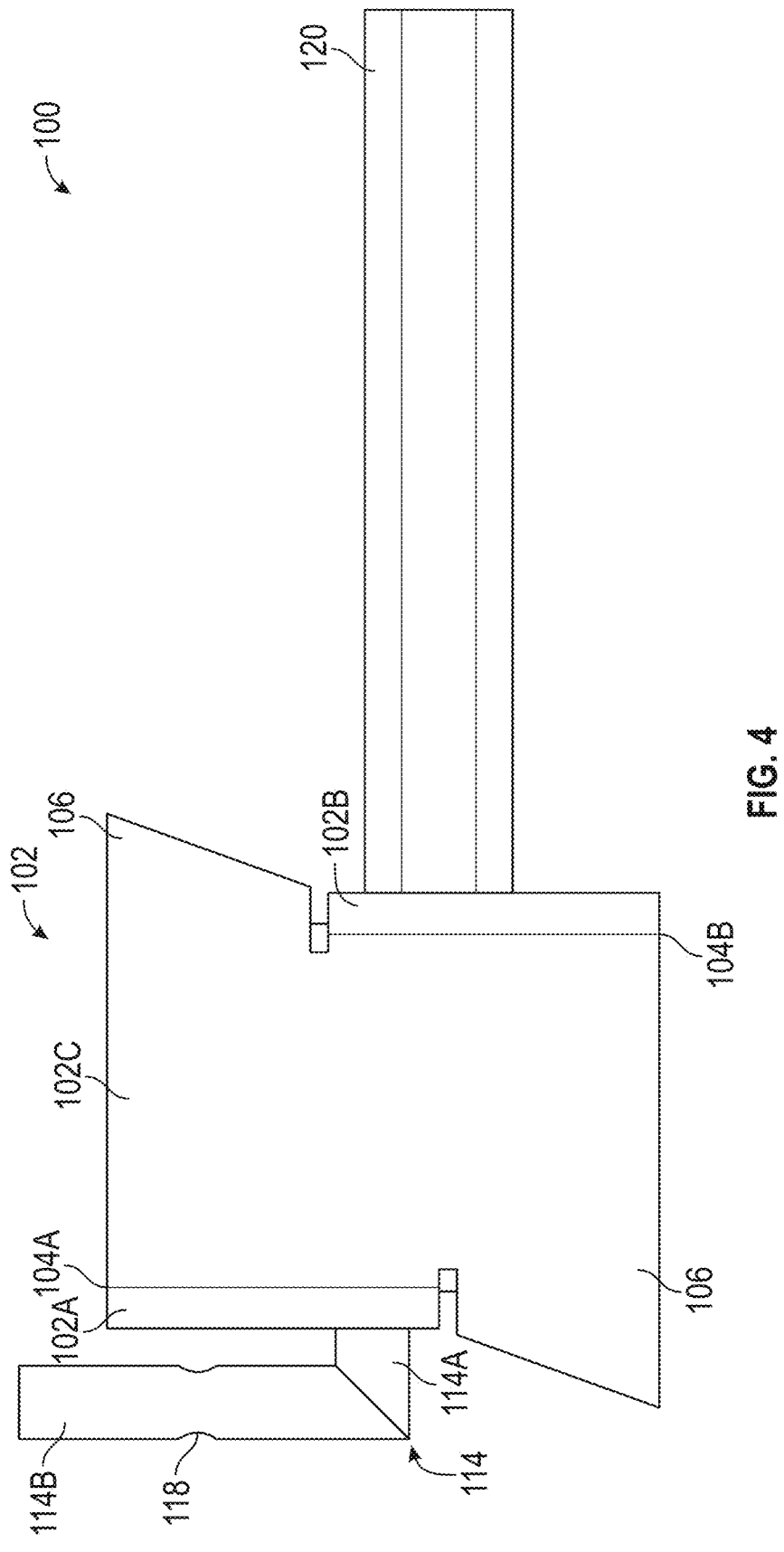
FIG. 4 illustrates an isometric rear view of an exemplary embodiment of a bracket assembly.

Referring to FIG. 4, illustrated is an isometric rear view of an exemplary embodiment of a bracket assembly 100 designed and constructed in accordance with the disclosed principles. As previously discussed, one or more of walls 102A, 102B, 102C may include flanges 106 to facilitate sliding of the bracket assembly 100 along a support structure. In the non-limiting embodiment illustrated in FIG. 4, the side wall 102C may include planar flanges 106 extending from the top and bottom edges of the side wall 120c. The flanges 106 may have a greater width than the side wall 102C and may include an angled edge. In an embodiment, one or more of the first wall 102A and second wall 102B may additionally or alternatively include one or more flanges 106 extending from their respective top and/or bottom edges.

Figure 5:
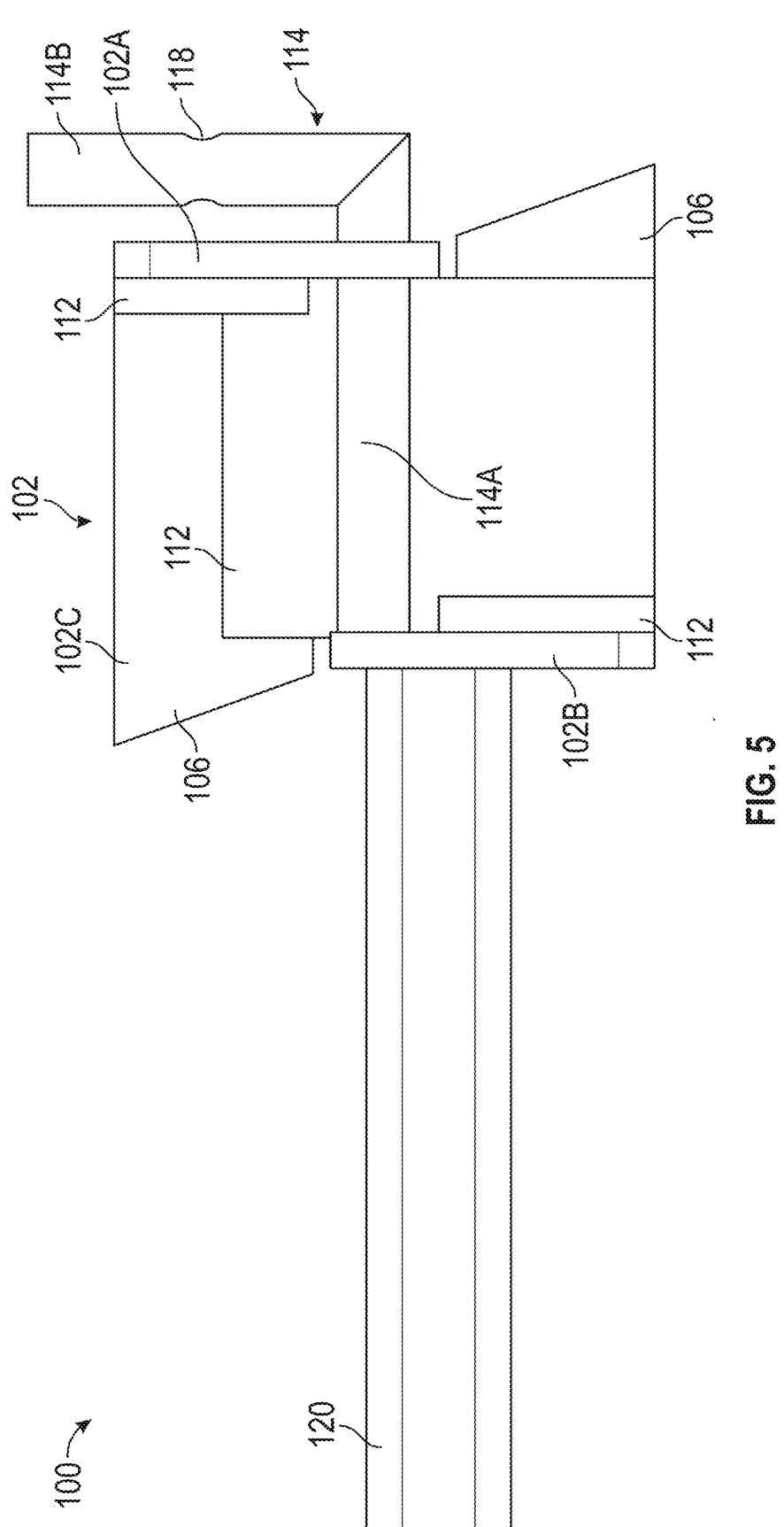
FIG. 5 illustrates an isometric front view of an exemplary embodiment of a bracket assembly.

Referring to FIG. 5, illustrated is an isometric front view of an exemplary embodiment of a bracket assembly 100 designed and constructed in accordance with the disclosed principles. As previously discussed, the bracket assembly 100 may include a plurality of gaskets 112 disposed on the inner surface of the body 102. In the non-limiting exemplary embodiment illustrated in FIG. 5, the gaskets 112 may be disposed on the inner surface of the first wall 102A, second wall 102B, and side wall 102C. The gaskets 112 may be sized to cover only a portion of the wall 102A, 102B, 102C upon which they are disposed and may be strategically positioned to promote secure sealing between the bracket assembly 100 and the support structure. In an alternative embodiment, the gaskets 112 may be sized to cover the entire surface of one or more of the walls 102A, 102B, 102C, while still avoiding obstruction of the apertures 108, 110 disposed through the body 102 as previously mentioned. Additionally, the side wall 102C may include planar flanges 106 extending from the top and bottom edges of the side wall 120c, wherein the flanges 106 may have a greater width than the side wall 102C and may include an angled edge.

Figure 6:
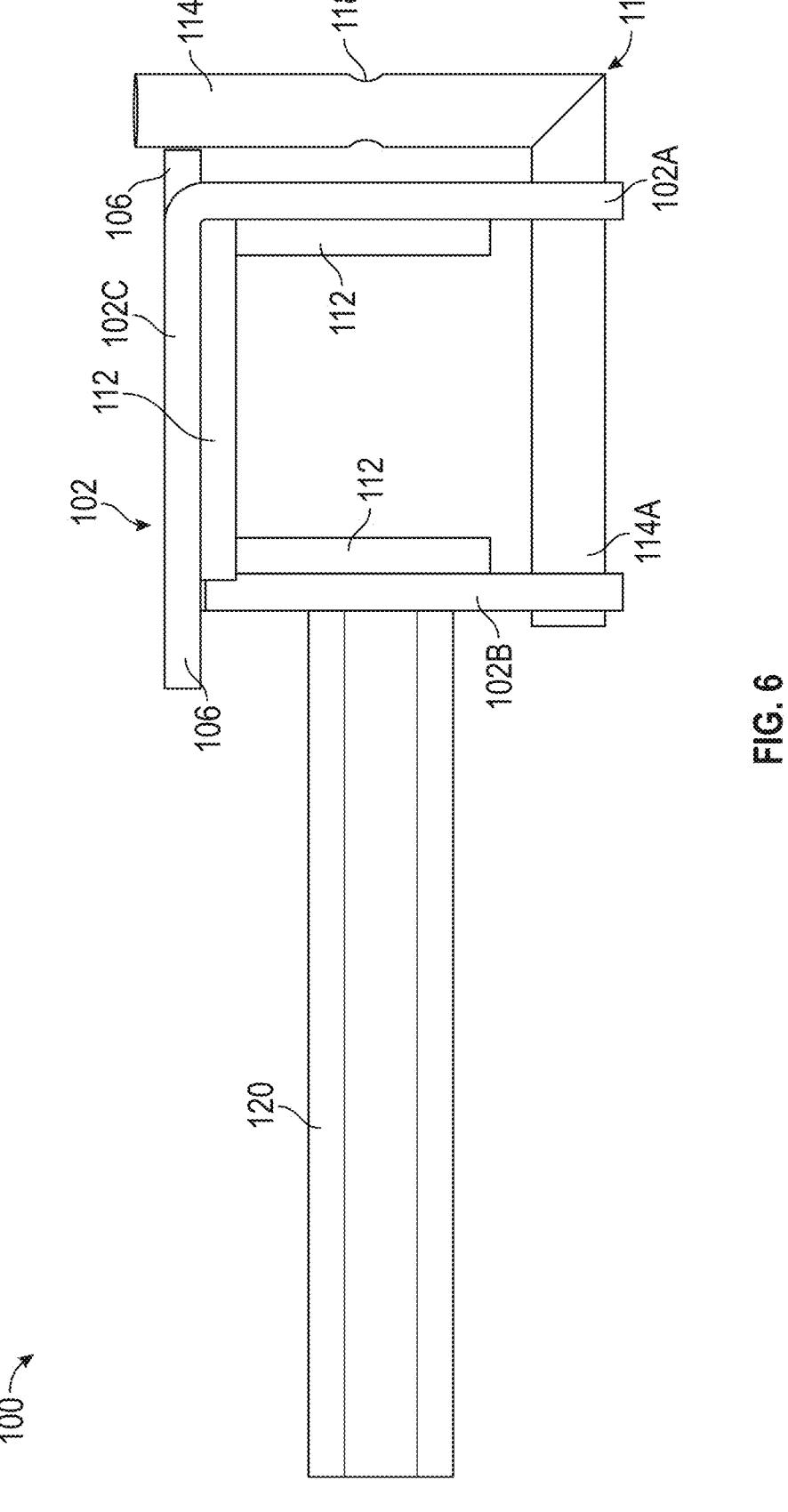
FIG. 6 illustrates an isometric top view of an exemplary embodiment of a bracket assembly.

Referring to FIG. 6, illustrated is an isometric top view of an exemplary embodiment of a bracket assembly 100 designed and constructed in accordance with the disclosed principles. As previously discussed, a plurality of gaskets 112 may be fixed to the inner surface of the body 102. In the non-limiting exemplary embodiment illustrated in FIG. 6, gaskets 112 may be disposed on the inner surface of the first wall 102A, second wall 102B, and side wall 102C and may be positioned adjacent to and in contact with one another. Additionally, flanges 106 extending from the top and bottom surface of the side wall 102C may have a greater width than the side wall 102C such that the flanges 106 extend beyond the first wall 102A and second wall 102B.

Figure 7:
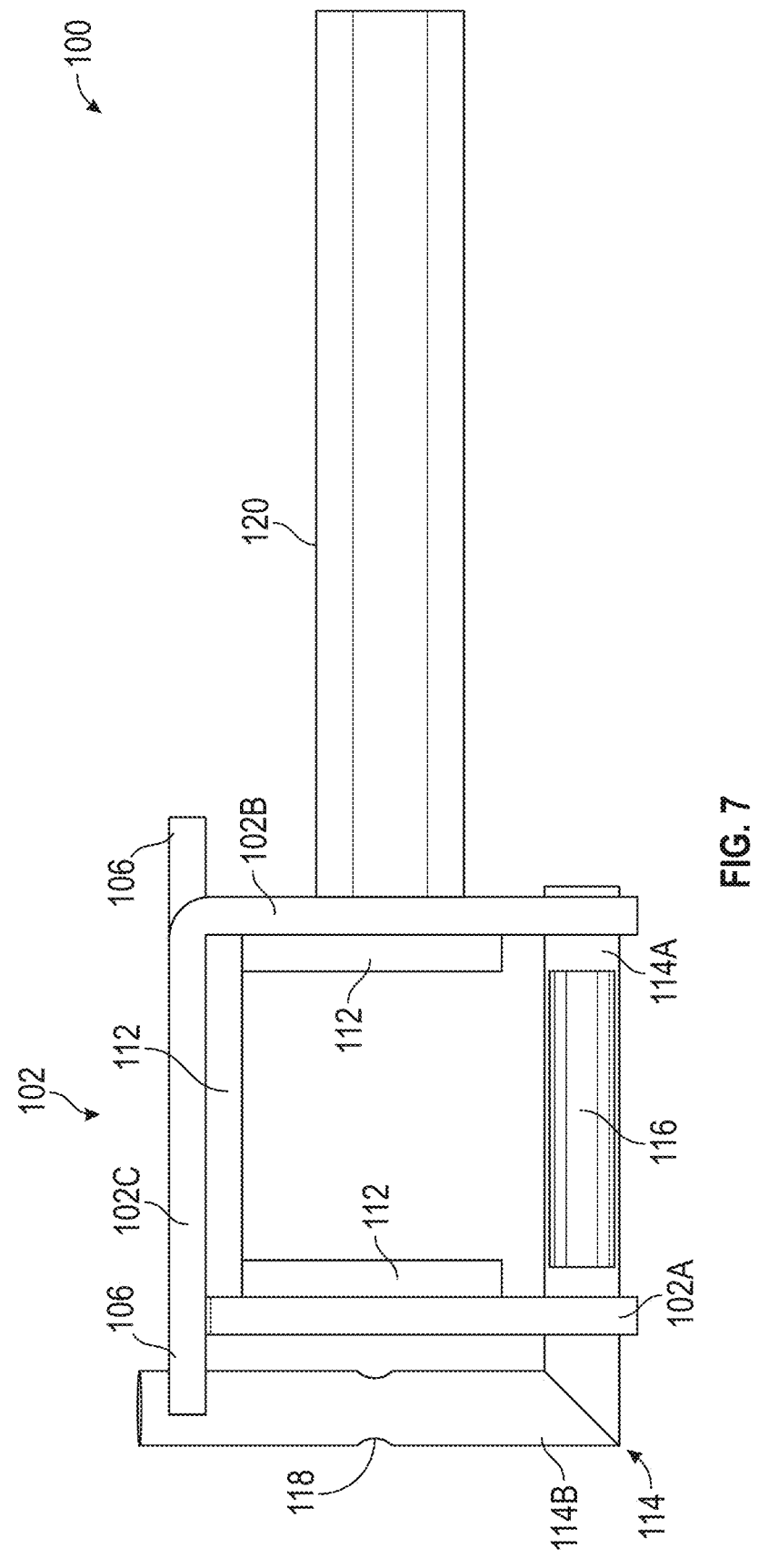
FIG. 7 illustrates an isometric bottom view of an exemplary embodiment of a bracket assembly.

Referring to FIG. 7 illustrated is an isometric bottom view of an exemplary embodiment of a bracket assembly 100 designed and constructed in accordance with the disclosed principles. As previously discussed, the bracket assembly 100 may include a tightening means comprising a protrusion 116 that at least partially surrounds the circumference of the pin 114A and a plurality of gaskets 112 fixed to the inner surface of the body 102. When the bracket assembly 100 is in the assembled, unsecured configuration, which is discussed in greater detail with reference to FIG. 8B that follows, the protrusion 116 may be oriented away from the channel defined by the body 102. In the non-limiting exemplary embodiment illustrated in FIG. 7, the protrusion 116 may be oriented away from the channel and toward the bottom of the bracket assembly 100. The position of the protrusion 116 may be altered by pivoting the handle 114B. The bracket assembly 100 may also include rectangular gaskets 112 fixed to the inner surface of the first wall 102A, second wall 102B, and side wall 102C to frictionally seal the bracket assembly 100 to a support structure. The tightening means is discussed in greater detail with reference to FIG. 8A-8C.

Figures 8A, 8B, 8C:
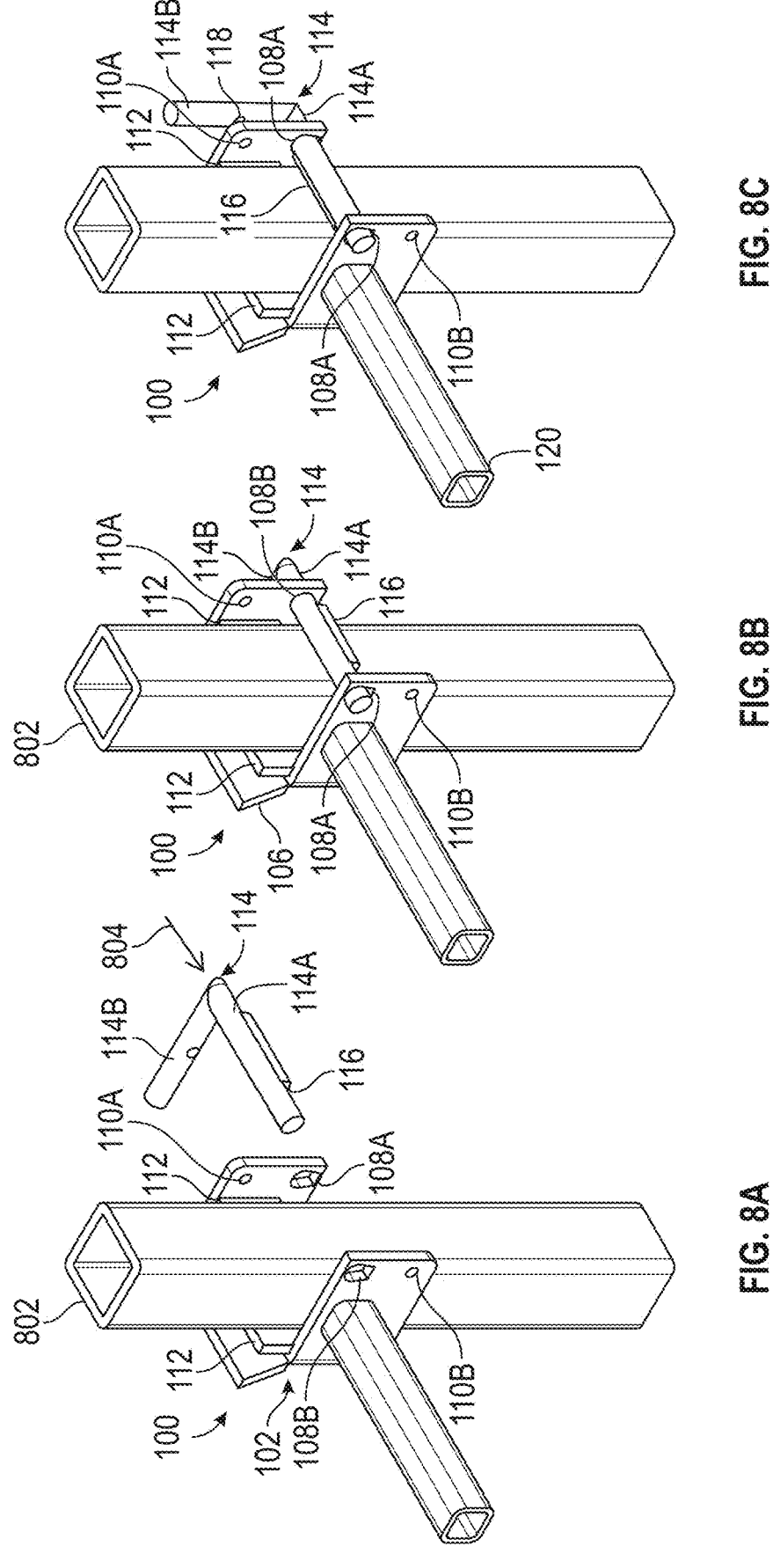
FIG. 8A illustrates an isometric view of an exemplary embodiment of a bracket assembly in a partially disassembled configuration.
FIG. 8B illustrates an isometric view of an exemplary embodiment of a bracket assembly in an assembled, unsecured configuration.
FIG. 8C illustrates an isometric view of an exemplary embodiment of a bracket assembly in an assembled, secured configuration.

Referring to FIG. 8A, illustrated is an isometric view of an exemplary embodiment of a bracket assembly 100 in a partially disassembled configuration. In the non-limiting exemplary embodiment illustrated in FIG. 8A, the latch 114 may be uncoupled from the body 102. As previously discussed, the body 102 may define a generally c-shaped open channel for engaging a support structure 802. With the latch 114 separated from the bracket assembly 100, the body 102 may closely engage a support structure 802. The plurality of apertures 108, 110 may be positioned such that they are not obstructed by the support structure 802 when the body 102 engages the support structure 802. The plurality gaskets 112 may be disposed on the inner surface of the body 102 such that the gaskets 112 may contact one or more surfaces of the support structure 802. In the partially disassembled configuration, the body 102 may be slid along the support structure 802 until the desired position is achieved.

To assemble the bracket assembly 100, the user may couple the first wall 102A of the body 102 to the second wall 102B of the body 102 using the latch 114. With the latch 114 oriented such that the pin 114A and protrusion 116 are aligned with the first set of apertures 108, the latch 114 may be moved in the direction of arrow 804 such that the pin 114A and protrusion 116 may engage the first set of apertures 108. During assembly, the protrusion 116 may be oriented away from the support 802. In the non-limiting embodiment illustrated in FIG. 8A, the protrusion 116 may be oriented toward the bottom of the bracket assembly 100 and the handle 114B may be horizontally oriented during assembly. It will be understood that the illustrated orientations of the protrusion 116 and handle 114B are non-limiting, and other orientations are within the scope of the claims. The latch 114 may be moved in the direction of arrow 804 until the handle 114B contacts the body 102.

Referring to FIG. 8B, illustrated is an isometric view of an exemplary embodiment of a bracket assembly 100 in an assembled, unsecured configuration. In the assembled, unsecured configuration, the pin 114A of the latch 114 may engage the first set of apertures 108. In the assembled, unsecured configuration, the latch 114 may be oriented such that the pin 114A and protrusion 116 are aligned with the first set of apertures 108, and the protrusion 116 may be oriented away from the support 802. In the non-limiting embodiment illustrated in FIG. 8B, the protrusion 116 may initially be oriented toward the bottom of the bracket assembly 100 and the handle 114B may be horizontally oriented when the bracket assembly 100 is in the assembled, unsecured configuration. After assembly, the handle 114B may be pivoted such that the pin 114A and the attached protrusion 116 are rotated about the longitudinal axis of the pin 114A. The protrusion 116 and the handle 114B may thereby be moved to a number of orientations when the bracket assembly 100 is in the assembled, unsecured configuration. In the assembled, unsecured configuration, the bracket assembly 100 may be loosely coupled to the support structure 802 such that the bracket assembly 100 may be slid along the support structure 802 until the desired position is achieved. To secure the bracket assembly 100 to the support structure 802, the handle 114B may be pivoted such that the protrusion 116 is rotated about the longitudinal axis of the pin 114A toward the support structure 802.

Referring to FIG. 8C illustrated is an isometric view of an exemplary embodiment of a bracket assembly 100 in an assembled, secured configuration. In the assembled, secured configuration, the protrusion 116 of the latch 114 may be oriented toward the support structure 802 such that the effective cross-sectional area of the channel is reduced. The protrusion 116 may be pressed against the surface of the support structure 802 such that a clamping force is applied to the support structure 802. The clamping force may cause the gaskets 112 to be tightly pressed against one or more surfaces of the support structure 802 to provide sealing friction against the support structure 802. Together, the latch 114 and the gaskets 112 may secure the bracket assembly 100 to the support structure 802 in a desired position. In the assembled, secured configuration, the handle aperture 118 may be aligned with one of the second set of apertures 110 such that the latch 114 may be locked in position using a second pin (not shown). In the non-limiting exemplary embodiment illustrated in FIG. 8C, the handle 114B may be in an upright orientation when the bracket assembly 100 is in the assembled, secured configuration such that the handle aperture 118 aligns with the third aperture 110A. As previously mentioned, the pin 114A of the latch 114 may alternatively be inserted through the first set of apertures 110 from the opposite direction such that the pin 114A first engages the second aperture 110B and then engages the first aperture 110A. In that configuration, the handle 114B may be in a downward orientation such that the handle aperture 118 aligns with the fourth aperture 110B when the bracket assembly 100 is in the assembled, secured configuration. In the assembled, secured configuration, the bracket assembly 100 may be coupled to an accessory, which is described in greater detail with reference to FIG. 9-11 that follow.

It may be desirable to return the bracket assembly 100 to the assembled, unsecured configuration to adjust the position of the bracket assembly 100 along the support structure 802. To return the bracket assembly 100 to the assembled, unsecured configuration, the second pin (not shown) may be removed from the handle aperture 118 and the aperture from the second set of apertures 110. The handle 114B may then be pivoted such that the protrusion 116 is rotated about the longitudinal axis of the pin 114A away from the support structure 802. When the bracket assembly 100 is returned to the assembled, unsecured configuration, the bracket assembly 100 may be loosely coupled to the support structure 802 such that the bracket assembly 100 may be slid along the support structure 802 until the desired position is achieved.

It may also be desirable to return the bracket assembly 100 to the partially disassembled configuration to uncouple the bracket assembly 100 from the support structure 802. To return the bracket assembly 100 to the partially disassembled configuration, the handle 114B may be pivoted such that the protrusion is rotated about the longitudinal axis of the pin 114A until the protrusion 116 is aligned with the first set of apertures 108. The latch 114 may then be moved in the direction opposite of arrow 804 illustrated in FIG. 8A such that the pin 114A and protrusion 116 may be disengaged from the first set of apertures 108, thereby separating the latch 114 from the body 102. In the partially disassembled configuration, the body 102 may be disengaged from the support structure 802. The bracket assembly 100 may be reassembled in a different location on the same support structure 802 or coupled to a different support structure 802.

While FIG. 8A-8C illustrate the bracket assembly 100 coupled to a vertical support structure 802, it will be understood that the bracket assembly 100 may be coupled to differently oriented support structures 802. For example, the bracket assembly 100 may be coupled to a horizontal support structure 802 such as a railing or beam, or a diagonal support structure 802 such as a brace.

Figure 9:
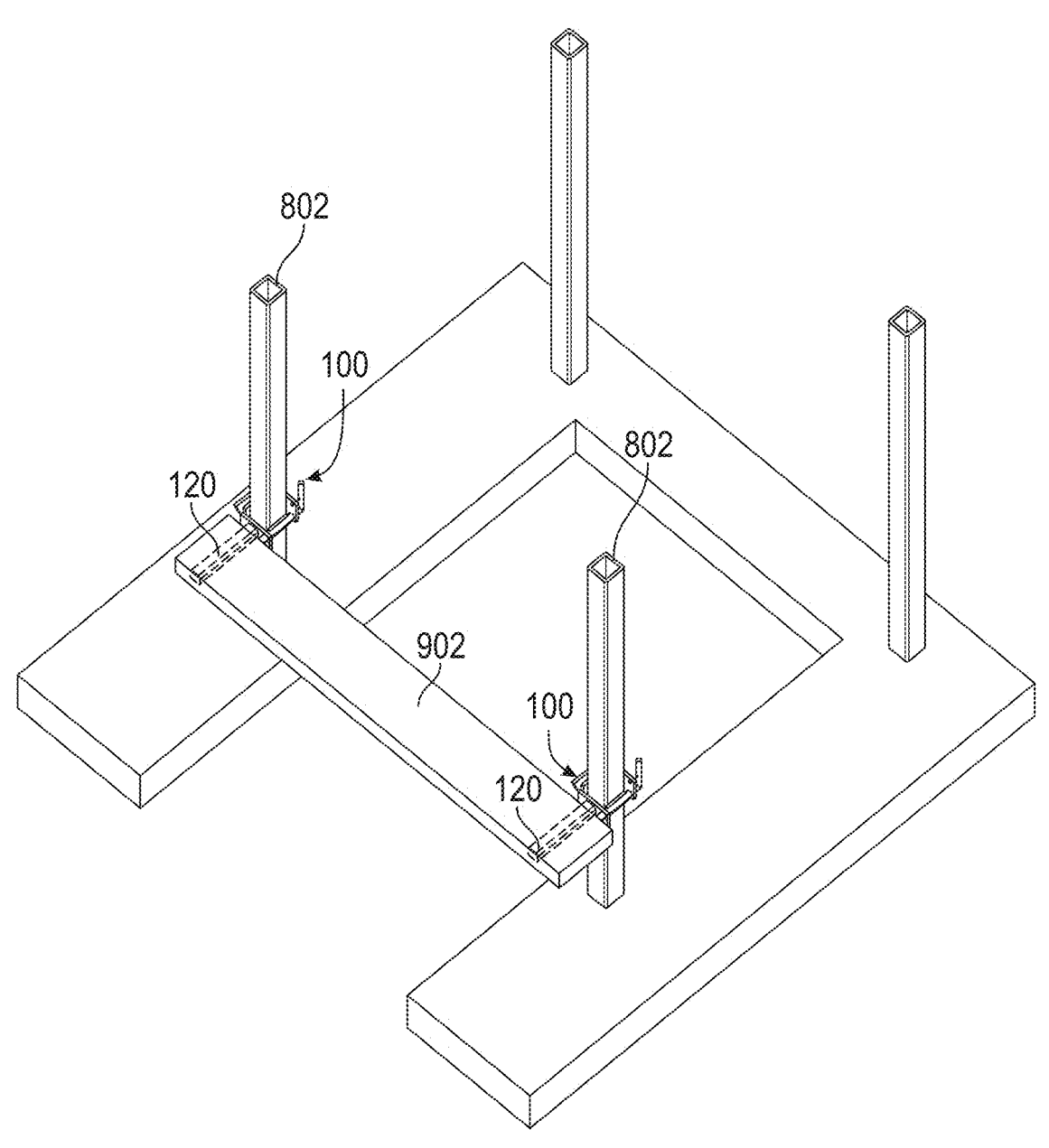
FIG. 9 illustrates an isometric view of an exemplary embodiment of a bracket assembly wherein the support shaft is supporting a platform.

Referring to FIG. 9, illustrated is an isometric view of an exemplary embodiment of a bracket assembly 100 in accordance with the present disclosure. As previously discussed, the bracket assembly 100 may be used to securely and removably couple accessories to a support structure of a boat dock or residential deck. Additionally, two or more bracket assemblies 100 may be used together to support an accessory from multiple sides. In the assembled, secured configuration, the bracket assembly 100 can support accessories across a wide range of weights and configurations. The bracket assembly 100 may be coupled to an accessory via the support shaft 120. In the non-limiting exemplary embodiment illustrated in FIG. 9, two or more bracket assemblies 100 may be used to support a platform 902 extending between two or more support structures 802 of a boat dock. In an embodiment, each end of the platform 902 may be disposed on a support shaft 120. In an alternative embodiment, the support shafts 120 may be inserted into hollow slots formed through the platform 902. The platform 902 may thereby be extended between two support structures 802 positioned on opposite sides of the dock, allowing a user to create a walkway over the water. In the assembled, secured configuration, the bracket assembly 100 can support the weight of the platform, as well as the weight of various items or persons on the platform, while maintaining the position of the bracket assembly 100 along the support structure 802.

Figure 10:
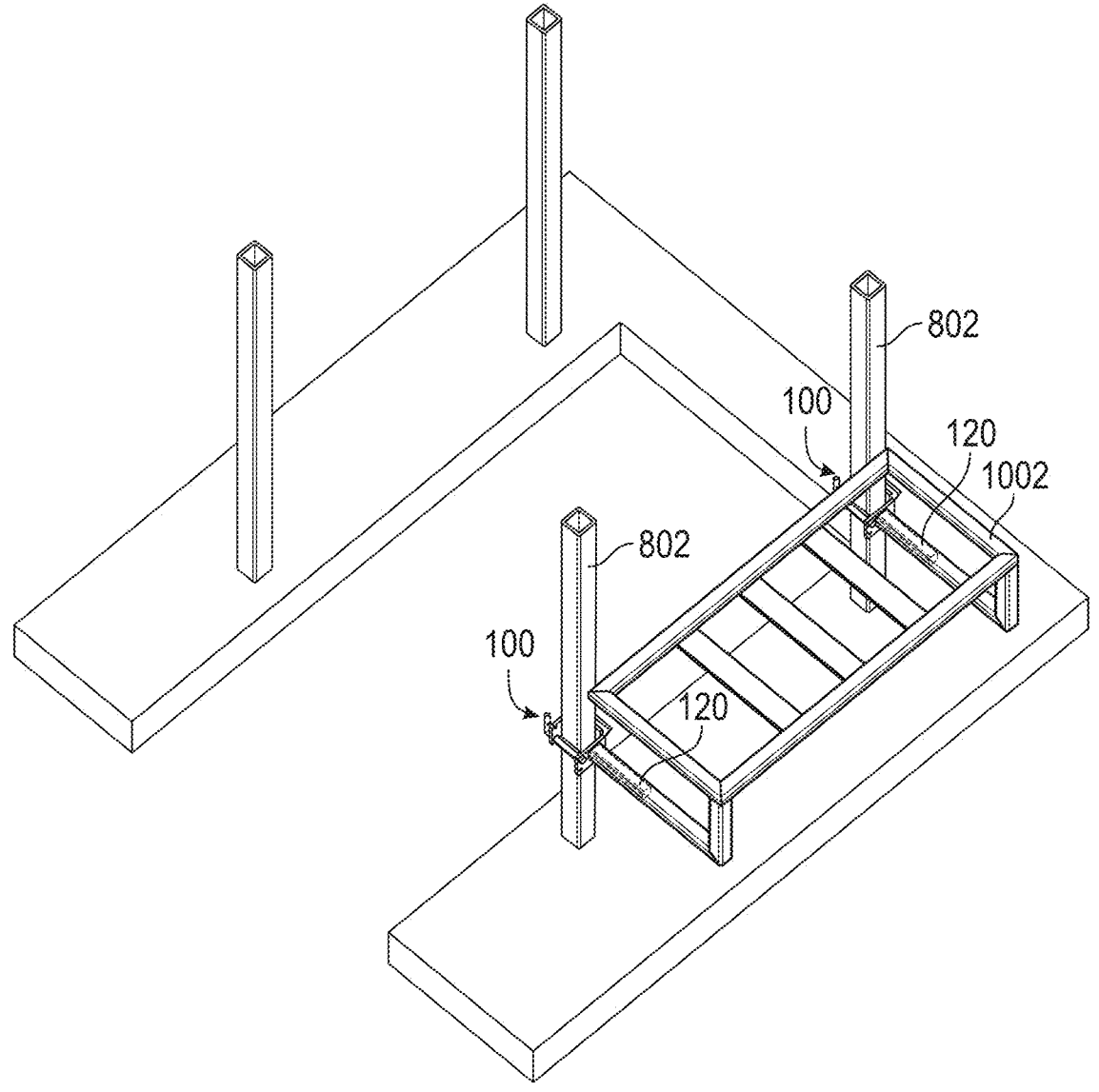
FIG. 10 illustrates an isometric view of an exemplary embodiment of a bracket assembly wherein the support shaft is supporting a table.

Referring to FIG. 10, illustrated is an isometric view of an exemplary embodiment of a bracket assembly 100 in accordance with the present disclosure. As previously discussed, the bracket assembly 100 may be used to secure accessories to a support structure 802 when the bracket assembly 100 in the assembled, secured configuration. As a non-limiting example, the bracket assembly 100 may be used to couple a table 1002 to the support structures 802 of a boat dock. In the non-limiting exemplary embodiment illustrated in FIG. 10, the support shaft 120 of each bracket assembly 100 may be inserted into the hollow tubing of the table 1002. One of ordinary skill in the art will recognize that the support shaft 120 may be coupled to other accessories, including but not limited to chairs, storage units, light fixtures, shelving, and the like.

Figure 11:
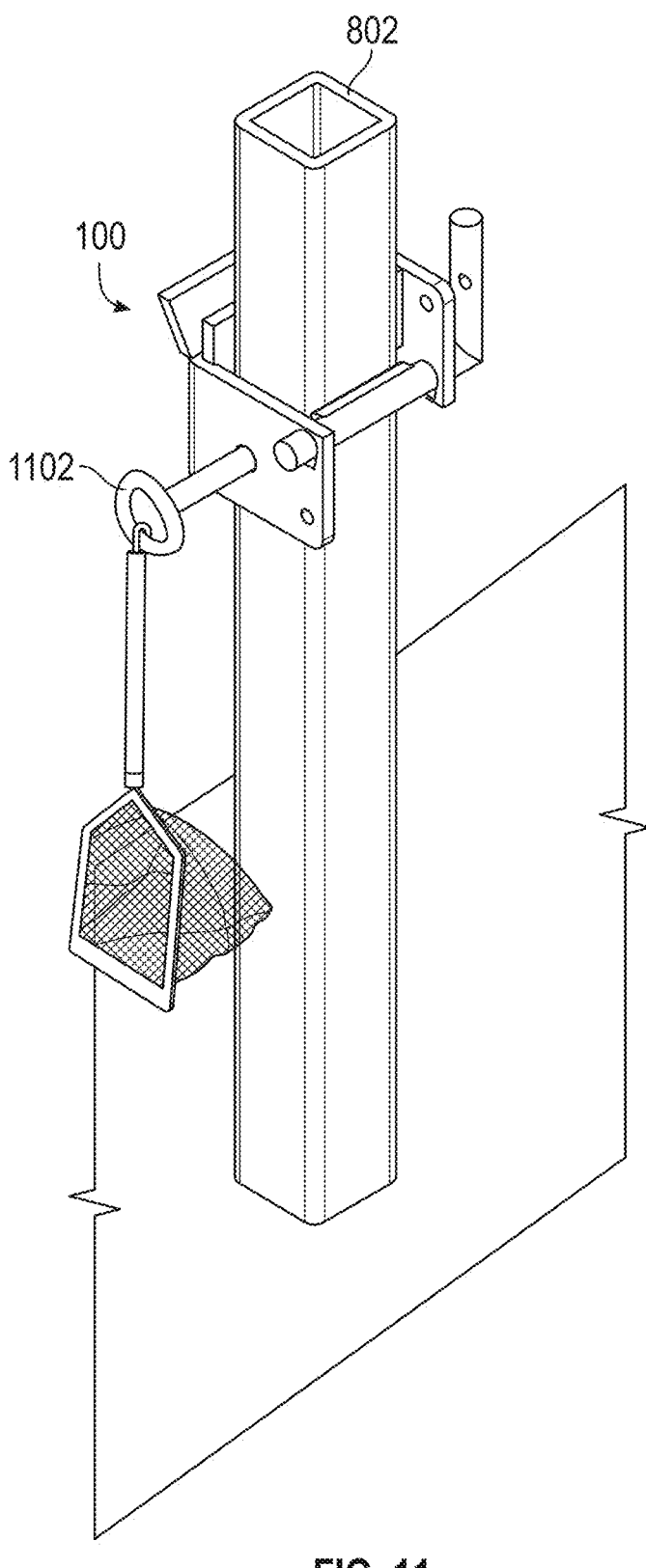
FIG. 11 illustrates an isometric view of an exemplary embodiment of a bracket assembly including an eye hook.

Referring to FIG. 11, illustrated is an isometric view of an exemplary embodiment of a bracket assembly 100 in accordance with the present disclosure. As previously mentioned, the bracket assembly 100 may include a support shaft for coupling accessories to the bracket assembly 100, thereby coupling accessories to a support structure 802. In another embodiment, the bracket assembly 100 may not include a support shaft and may instead include other attachment interfaces. In another embodiment, the bracket assembly 100 may include a support shaft that is removably attached to the body 102. With the support shaft uncoupled from the bracket assembly 100, other attachment interfaces may be coupled to the bracket assembly 100 in place of the support shaft. In the non-limiting exemplary embodiment illustrated in FIG. 11, the bracket assembly 100 may include an eye hook 1102 for hanging accessories such as a net or a canopy. Like the support shaft, the eye hook 102 may be permanently affixed to the body 102 or removably coupled to the body 102 by, for example, a corresponding threaded rod and aperture. One of ordinary skill in the art will understand that the bracket assembly 100 may include other support or attachment features not listed here and that other support or attachment features are within the scope of the claims.

While this disclosure has been particularly shown and described with reference to preferred embodiments, it will be understood by those skilled in the pertinent field of art that various changes in form and detail may be made therein without departing from the spirit and scope of the disclosed principles. The inventors expect skilled artisans to employ such variations as appropriate, and the inventors intend the disclosed principles to be practiced otherwise than as specifically described herein. Accordingly, this disclosure includes all modifications and equivalents of the subject matter recited in the claims appended hereto, as permitted by applicable law. Moreover, any combination of the above-described elements in all possible variations thereof is encompassed by the disclosure unless otherwise indicated herein or otherwise clearly contradicted by context.

Also, while various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosed principles set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" or disclosed principles in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

Moreover, the Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus, the following claims are hereby incorporated into the Detailed Description, with each claim standing on its own as a separate embodiment.

Any and all publications, patents, and patent applications cited in this disclosure are herein incorporated by reference as if each were specifically and individually indicated to be incorporated by reference and set forth in its entirety herein.

We claim:

1. A bracket assembly comprising:
a body defining an open channel with a first edge and a second edge, wherein the channel is configured to engage a support structure;
a latch configured to removably couple the first edge of the body to the second edge of the body, wherein a change in orientation or position of the latch selectively reduces an effective interior cross-sectional area of the body to control a clamping force on the support structure; and
one or more attachment interfaces configured to removably couple the bracket assembly to an accessory, wherein the body further comprises a plurality of apertures disposed proximate to the first edge and the second edge of the body, wherein the plurality of apertures includes a first set of apertures and a second set of apertures and wherein:
the first set of apertures is configured to engage the latch; and
the second set of apertures is spaced apart from the first set of apertures;
further wherein the latch comprises:
a pin sized and configured to removably and rotatably engage the first set of apertures;
a handle extending outwardly from the pin and configured to rotate the latch about the longitudinal axis of the pin; and
a protrusion at least partially surrounding the circumference of the pin.

2. The bracket assembly of claim 1, wherein the body further comprises a first wall, a second wall, and side wall configured to couple the first wall to the second wall.

3. The bracket assembly of claim 1, wherein the body further comprises flanges to facilitate sliding of the body along the support structure.

4. The bracket assembly of claim 1, wherein the first set of apertures is configured to receive the protrusion.

5. The bracket assembly of claim 1, further comprising a plurality of gaskets disposed on an inner surface of the body.

6. The bracket assembly of claim 1, further comprising a locking mechanism to maintain the bracket assembly tightly secured to the support structure.

7. The bracket assembly of claim 6, wherein the locking mechanism comprises:
the second set of apertures; and
a handle aperture disposed through the body of the handle, wherein the handle aperture is configured to align with one of the second set of apertures when the handle is in a desired position, and wherein the second set of apertures and the handle aperture are configured to receive a second pin to maintain the handle in the desired position.

8. The bracket assembly of claim 1, wherein the attachment interface comprises a support shaft.

9. The bracket assembly of claim 1, wherein the attachment interface comprises a hook.

10. The bracket assembly of claim 1, wherein the attachment interface is removably coupled to the body.

11. A method of removably and securely coupling an accessory to a support structure comprising:
securely coupling a bracket assembly to a support structure, and
coupling an accessory to the bracket assembly, wherein the bracket assembly comprises:
a body defining a generally c-shaped open channel with a first edge and a second edge, wherein the channel is configured to engage a support structure;
a latch configured to removably couple the first edge of the body to the second edge of the body, wherein a change in orientation or position of the latch selectively reduces an effective interior cross-sectional area of the body to control a clamping force on the support structure; and
one or more attachment interface configured to removably couple the bracket assembly to an accessory, wherein the body further comprises a plurality of apertures disposed proximate to the first edge and the second edge of the body, wherein the plurality of apertures includes a first set of apertures and a second set of apertures and wherein:
the first set of apertures is configured to engage the latch; and
the second set of apertures is spaced apart from the first set of apertures;
further wherein the latch comprises:
a pin sized and configured to removably and rotatably engage the first set of apertures;
a handle extending outwardly from the pin and configured to rotate the latch about the longitudinal axis of the pin; and
a protrusion at least partially surrounding the circumference of the pin.

12. The method of claim 11, further comprising a plurality of gaskets disposed on an inner surface of the body.

13. The method of claim 12, wherein securely coupling a bracket assembly to a support structure comprises:
coupling the body to the support structure,
inserting the pin through the first set of apertures,
sliding the body along the support structure to a desired position, and
rotating the handle until the protrusion and plurality of gaskets are tightly pressed against the support structure.

14. The method of claim 13, wherein the bracket assembly further comprises a locking mechanism configured to maintain the bracket assembly tightly secured to the support structure.

15. The method of claim 14, wherein the locking mechanism comprises:
the second set of apertures; and
a handle aperture disposed through the body of the handle, wherein the handle aperture is configured to align with one of the second set of apertures when the handle is in a desired position and receive a second pin.

16. A bracket assembly comprising:
a generally c-shaped bracket defining an open channel with a first edge and a second edge, wherein the channel is configured to engage a support structure, and wherein the body comprises a plurality of apertures disposed proximate to the first edge and second edge of the body, wherein the plurality of apertures includes a first set of apertures and a second set of apertures;
a latch configured to removably couple the first edge of the bracket to the second edge of the bracket, the latch comprising:

a pin sized and configured to removably and rotatably engage the first set of apertures;

a handle extending outwardly from the pin and configured to rotate the latch about the longitudinal axis of the pin, the handle further comprising a handle aperture disposed through the body of the handle and configured to align with one of the second set of apertures when the handle is in a desired position, wherein the second set of apertures and the handle aperture are configured to receive a second pin to maintain the handle in the desired position; and a protrusion at least partially surrounding the circumference of the pin;

a plurality of gaskets disposed on an inner surface of the bracket; and one or more support shafts configured to removably couple the bracket assembly to an accessory.

17. A bracket assembly comprising:

a body defining an open channel with a first edge and a second edge, wherein the channel is configured to engage a support structure;

a latch configured to removably couple the first edge of the body to the second edge of the body, wherein a change in orientation or position of the latch selectively reduces an effective interior cross-sectional area of the body to control a clamping force on the support structure;

a locking mechanism to maintain the bracket assembly tightly secured to the support structure, wherein the locking mechanism comprises:

a plurality of apertures disposed proximate to the first edge and second edge of the body;

a latch aperture disposed through the latch, wherein the latch aperture is configured to align with the plurality of apertures when the latch is in a desired position, and wherein the plurality of apertures and the latch aperture are configured to receive a pin to maintain the latch in the desired position; and one or more attachment interfaces configured to removably couple the bracket assembly to an accessory.

18. The bracket assembly of claim 17, wherein the body further comprises a first wall, a second wall, and side wall configured to couple the first wall to the second wall.

19. The bracket assembly of claim 17, wherein the body further comprises flanges to facilitate sliding of the body along the support structure.

20. The bracket assembly of claim 17, wherein the plurality of apertures includes a first set of apertures and a second set of apertures and wherein:

the first set of apertures is configured to engage the latch; and the second set of apertures is spaced apart from the first set of apertures.

21. The bracket assembly of claim 20, wherein the latch comprises:

a pin sized and configured to removably and rotatably engage the first set of apertures;

a handle extending outwardly from the pin and configured to rotate the latch about the longitudinal axis of the pin; and a protrusion at least partially surrounding the circumference of the pin.

22. The bracket assembly of claim 17, wherein the first set of apertures is configured to receive the protrusion.

23. The bracket assembly of claim 17, further comprising a plurality of gaskets disposed on an inner surface of the body.

24. The bracket assembly of claim 17, wherein the attachment interface comprises a support shaft.

25. The bracket assembly of claim 17, wherein the attachment interface comprises a hook.

26. The bracket assembly of claim 17, wherein the attachment interface is removably coupled to the body.

* * * * *